United States Patent
Lee et al.

(10) Patent No.: US 6,999,252 B2
(45) Date of Patent: Feb. 14, 2006

(54) COLOR WHEEL HAVING A LIMITING ELEMENT FOR PREVENTING RADIAL DISPLACEMENT

(75) Inventors: Ming Lee, Dong-Guan (CN); Yan-Jun Jia, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/887,392

(22) Filed: Jul. 8, 2004

(65) Prior Publication Data

US 2005/0168857 A1   Aug. 4, 2005

(30) Foreign Application Priority Data

Jan. 30, 2004   (TW) ................ 93102182 A

(51) Int. Cl.
G02B 5/22     (2006.01)
G02B 7/00     (2006.01)

(52) U.S. Cl. ............... 359/892; 359/891; 359/885; 348/743; 356/418; 353/84; 362/293

(58) Field of Classification Search ........... 359/885, 359/891, 892; 348/743; 356/418; 353/84; 362/293

See application file for complete search history.

(56) References Cited

U.S. PATENT DOCUMENTS 4,076,393 A * 2/1978 Bates .................. 359/892
6,715,887 B1 * 4/2004 Chang .................. 353/84

FOREIGN PATENT DOCUMENTS

TW      334891     9/1986
TW      528170     4/2003

* cited by examiner

Primary Examiner—Leonidas Boutsikaris
(74) Attorney, Agent, or Firm—Merchant & Gould P.C.

(57) ABSTRACT

A color wheel includes a carrier, a color filter assembly mounted coaxially on the central boss and formed by a plurality of annularly arranged filter segments, a press cover connected to the carrier to press the filter segments against the carrier, and a limiting element. The color filter assembly defines inner and outer peripheries, upper and lower surfaces extending between the inner and outer peripheries, and an engaging element projecting axially from one of the upper and lower surfaces. The limiting element projects axially toward the engaging element from one of the carrier and the press cover to engage the engaging element so as to prevent the color filter assembly from displacing radially from an axis of the carrier due to a centrifugal force.

6 Claims, 6 Drawing Sheets

COLOR WHEEL HAVING A LIMITING ELEMENT FOR PREVENTING RADIAL DISPLACEMENT

CROSS-REFERENCE TO RELATED APPLICATION

This application claims priority of Taiwanese Application No. 093102182, filed on Jan. 30, 2004.

BACKGROUND OF THE INVENTION

1. Field of the Invention

The invention relates to a color wheel, more particularly to a color wheel for an optical projection device.

2. Description of the Related Art

Referring to FIGS. 1 and 2, a conventional color wheel is mounted on a motor (not shown), and has a carrier 1 fixed on the motor and having a carrier surface 101, and a plurality of filter segments 2 that are adhered to the carrier surface 101. When the motor drives the carrier 1 and the filter segments 2 to rotate at a high speed, light beams projected from a light source can pass through the filter segments 2 so as to produce an image.

Although the conventional color wheel can achieve its intended purpose, in actual production and use, it has the following disadvantages:

1. The filter segments 2 are adhered to the carrier surface 101 through an adhesive layer (not shown). When the motor drives the filter segments 2 to rotate at a high speed, the filter segments 2 are likely to move radially by virtue of centrifugal forces since there is no structure provided between the carrier 1 and the filter segments 2 that can prevent radial movement of the filter segments 2.

2. The filter segments 2 are adhered to the carrier surface 101 through an adhesive layer, such as a thermosetting adhesive. Since the materials of the filter segments 2 and the carrier 1 are different, that is, the filter segments 2 are normally made of glass, whereas the carrier 1 is made of aluminum, when the filter segments 2 and the carrier 1 are bonded by heat, because the coefficients of expansion thereof are different, bonding accuracy is adversely affected.

3. Since the carrier 1 is fixed to the motor, and since the filter segments 2 are adhered fixedly to the carrier 1, when the whole assembly has defects, such as assembly inaccuracy and incorrectable rotational imbalance, the conventional color wheel does not permit partial replacement of component parts such that the whole assembly, including the motor, has to be discarded. As a result, not only is there a waste of components, but the production cost is increased as well.

SUMMARY OF THE INVENTION

Therefore, the object of the present invention is to provide a color wheel that can prevent radial movement of filter segments due to a centrifugal force and that permits partial replacement.

According to this invention, a color wheel comprises a carrier, a color filter assembly, a press cover, and a limiting element. The color filter assembly is mounted coaxially on the carrier, and is formed by a plurality of annularly arranged filter segments. The color filter assembly defines an inner periphery extending around an axis of the carrier, an outer periphery extending around the inner periphery, upper and lower surfaces extending between the inner and outer peripheries, and an engaging element projecting axially from one of the upper and lower surfaces. The press cover is connected to the carrier to press the filter segments against the carrier. The limiting element projects axially toward the engaging element from one of the carrier and the press cover to engage the engaging element so as to prevent the color filter assembly from displacing radially from the axis of the carrier due to a centrifugal force.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
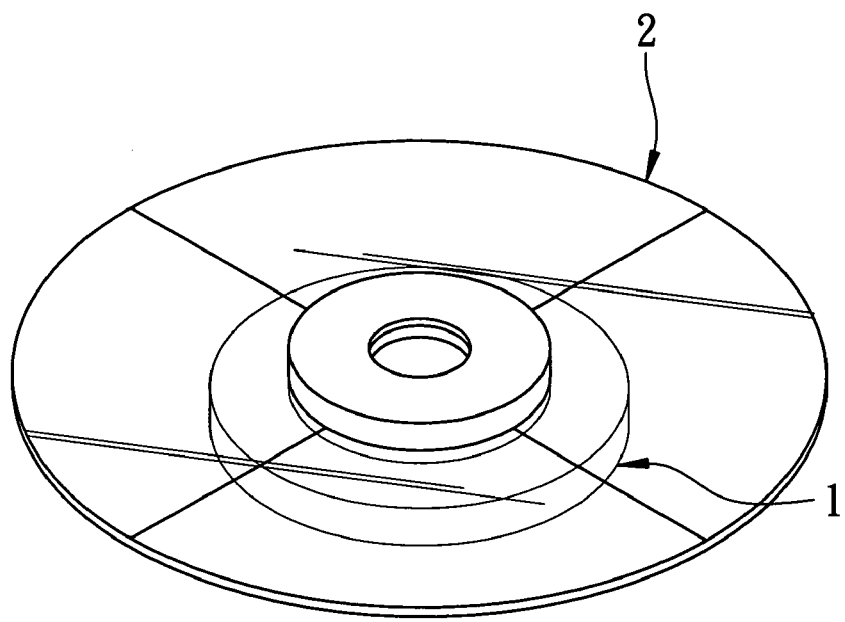
FIG. 1 is a perspective view of a conventional color wheel.
Figure 2:
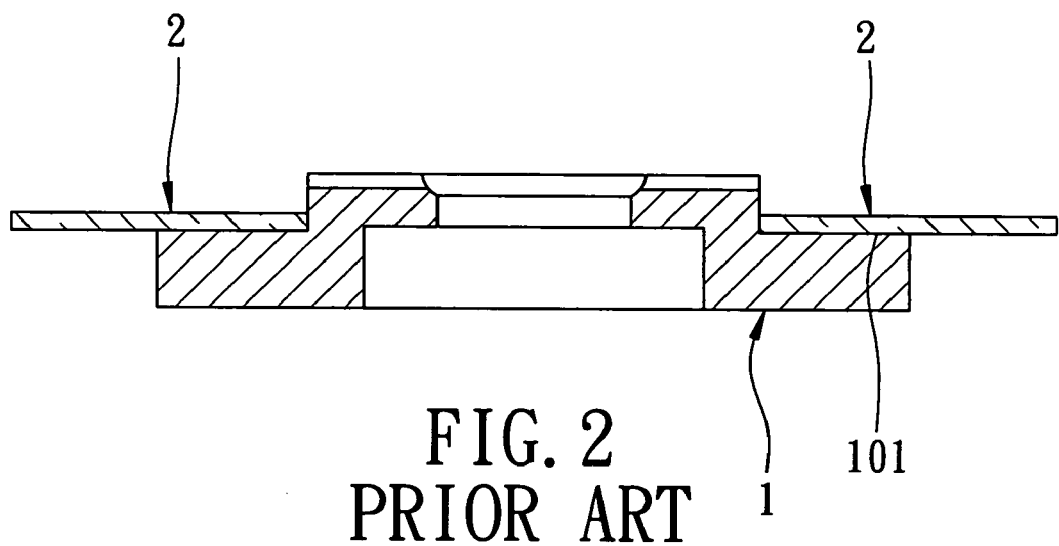
FIG. 2 is a sectional view of the conventional color wheel.

Before the present invention is described in greater detail, it should be noted that like elements are denoted by the same reference numerals throughout the disclosure.

Figure 3:
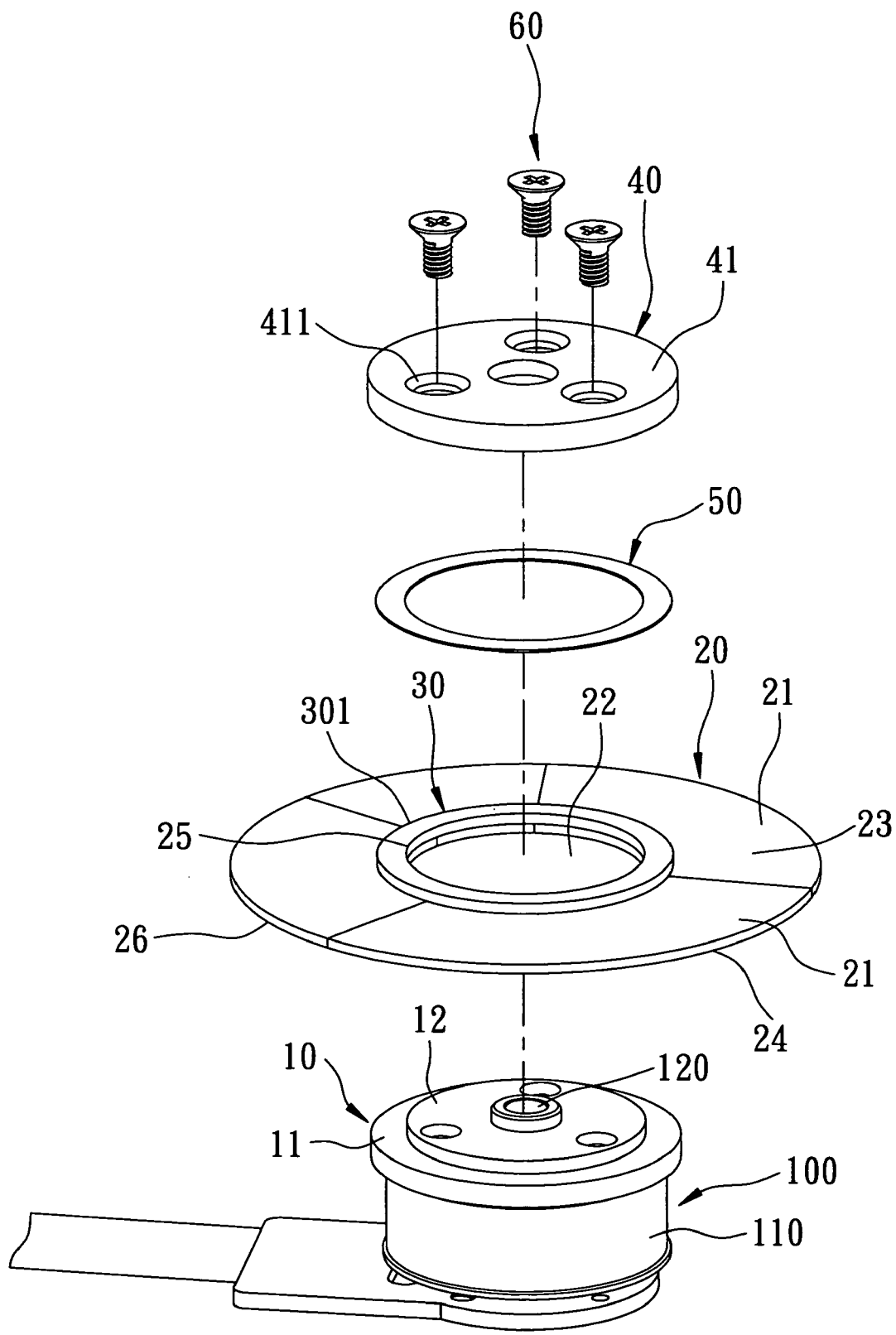
FIG. 3 is an exploded perspective view of the first preferred embodiment of a color wheel according to the present invention.
Figure 4:
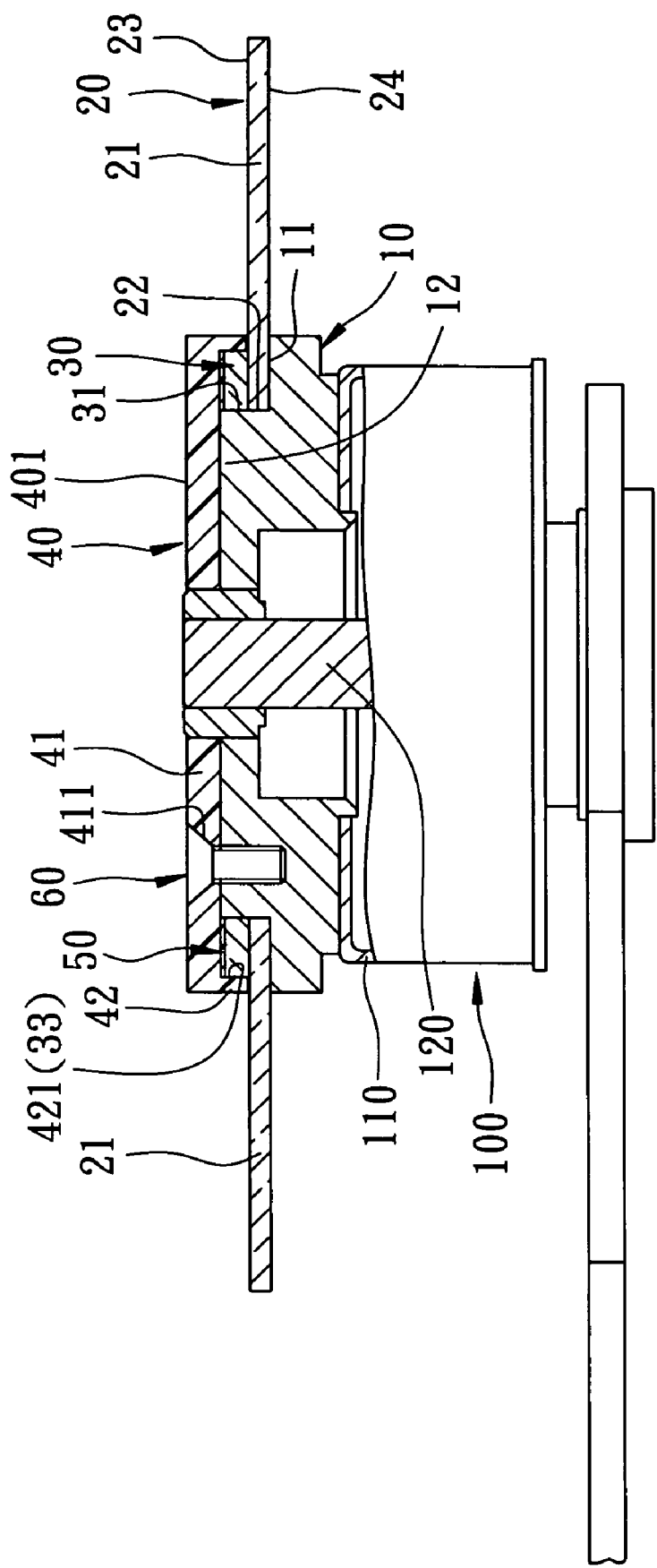
FIG. 4 is a partly sectional view of the first preferred embodiment in an assembled state.

Referring to FIGS. 3 and 4, the first preferred embodiment of a color wheel according to the present invention is adapted to be mounted on a drive unit, and is shown to comprise a carrier 10, a color filter assembly 20, a press cover 40, a packing ring 50, a limiting element, and three bolts 60. The drive unit is a motor 100 including a rotary hub 110 and a rotary shaft 120.

The carrier 10 is mounted on and is rotatable with the rotary hub 110 and the rotary shaft 120. The carrier 10 has a carrier surface 11, and a central boss 12 extending axially and upwardly from the carrier surface 11 and having an axis.

The color filter assembly 20 is mounted coaxially on the central boss 12, and is formed by a plurality of annularly arranged filter segments 21 that define a central hole 22, an inner periphery 25 extending around the central hole 22, an outer periphery 26 extending around the inner periphery 25, an upper surface 23 and a lower surface 24 extending between the inner and outer peripheries 25, 26, and an engaging element 30. In this embodiment, the engaging element 30 is formed as an annular flange 301, which projects axially from the upper surface 23 proximate to the inner periphery 25 and which has an outer peripheral face 33. The central boss 12 of the carrier 10 extends through the central hole 22. The central hole 22 has a diameter nearly equal to an outer diameter of the central boss 12.

Figure 5:
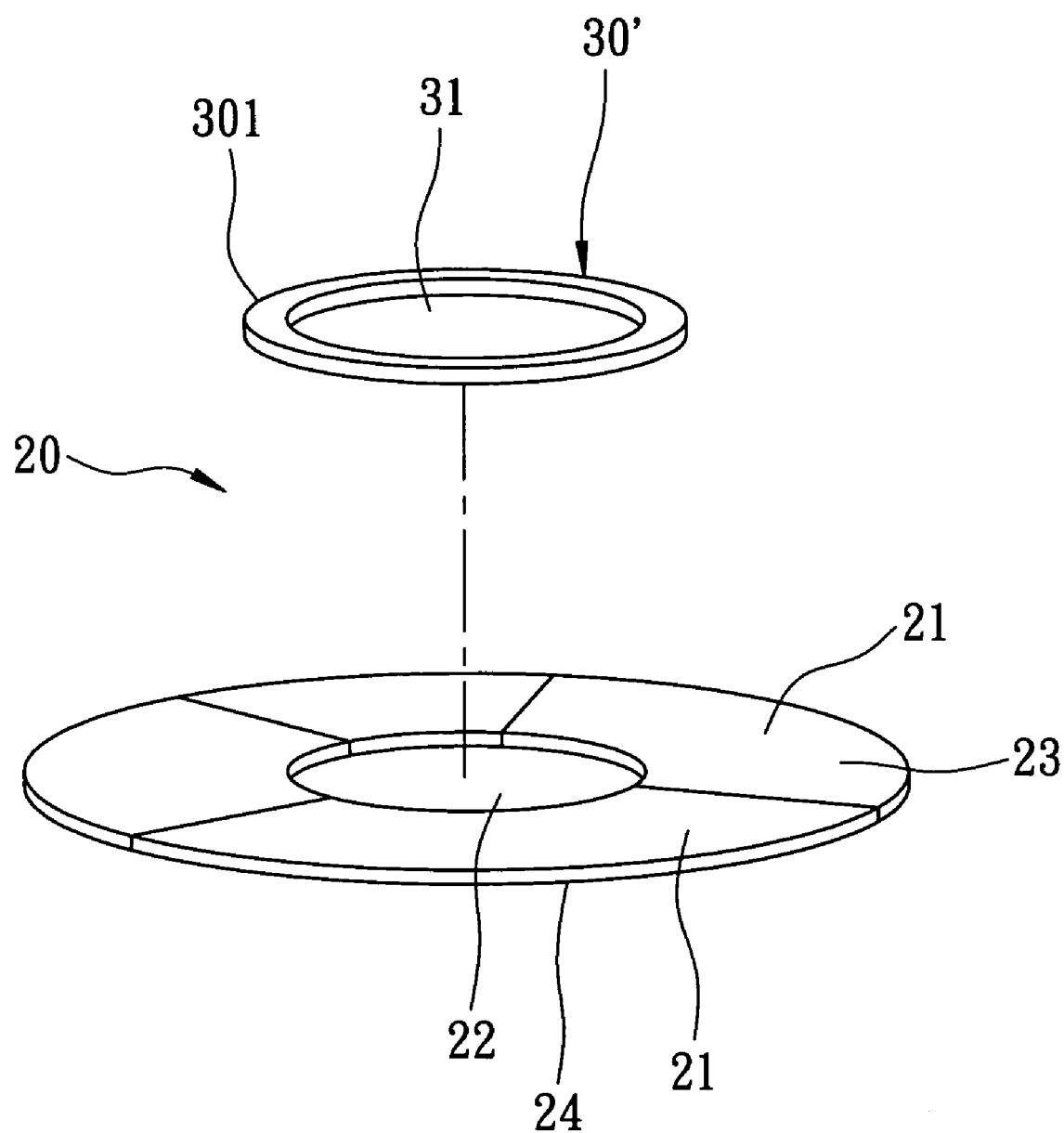
FIG. 5 is an exploded perspective view of a color filter assembly and an engaging element of the first preferred embodiment.

As shown in FIG. 5, the annular flange 301 is formed by attaching a ring member 30' to the filter segments 21. The ring member 30' has a through hole 31. In this embodiment, the filter segments 21 and the ring member 30' are made of glass. The through hole 31 has a diameter nearly equal to the diameter of the central hole 22. The ring member 30' is adhered to the upper surface 23 proximate to the inner periphery 25. When the ring member 30' and the filter segments 21 are heated at a high temperature, they are bonded together to form a unitary body.

The press cover 40 is formed as a circular plate 401, and includes a top face 41, and three annularly spaced-apart through holes 411 extending downwardly from the top face 41 for extension of the bolts 60 therethrough, respectively.

The limiting element, in this embodiment, is provided on the press cover 40, and is formed as an annular protrusion 42 which projects axially and downwardly from an outer periphery of the circular plate 401 and which has an inner peripheral face 421 extending around and abutting against the outer peripheral face 33 of the annular flange 301.

The packing ring 50 is clamped between a bottom face of the press cover 40 and a top face of the engaging element 30.

In assembly, the color filter assembly 20 is sleeved on the central boss 12 of the carrier 10 through the central hole 22, and the packing ring 50 and the press cover 40 are subsequently mounted on the color filter assembly 20. Then, the bolts 60 are passed respectively through the through holes 411 in the press cover 40, and engage threadedly the central boss 12 of the carrier 10 so that the press cover 40 is connected securely to the carrier 10. As such, the press cover 40 presses tightly the filter segments 21 against the carrier surface 11 through the packing ring 50 and the engaging element 30. At this time, the press cover 40 covers the central boss 12, the engaging element 30 and the packing ring 50, and the inner peripheral face 421 of the limiting element abuts against the outer peripheral face 33 of the engaging element 30.

When the motor 100 is actuated, through the rotary hub 110 and the rotary shaft 120, the carrier 10 and the color filter assembly 20 are rotated at a high speed so that light beams projected from a light source (not shown) can pass through the filter segments 21 so as to produce an image.

From the aforementioned description of the first preferred embodiment, some of the advantages of the present invention can be summarized as follows:

1. The filter segments 21 and the engaging element 30 are adhered together to form a unitary body, and the assembly of the filter segments 21 and the engaging element 30 is sleeved on the central boss 12 of the carrier 10. Thus, when the motor 100 drives the filter segments 21 to rotate at a high speed, even in the presence of a centrifugal force, the filter segments 21 can be prevented from displacing radially because of the engagement between the engaging element 30 and the central boss 12. Furthermore, the inner peripheral face 421 of the limiting element or the annular protrusion 42 abuts against the outer peripheral face 33 of the engaging element 30 so that the press cover 40 can further position the engaging element 30, thereby further preventing the filter segments 21 from displacing radially.

2. The filter segments 21 and the engaging element 30 are made of the same material. When the filter segments 21 and the engaging element 30 are bonded under a high temperature, since the coefficients of expansion thereof are the same, they produce the same degree of retraction and expansion, so that components are positioned accurately after being bonded together.

3. The filter segments 21 and the engaging element 30 are first adhered to form a unitary body, after which the bolts 60 are engaged to the carrier 10, so that the press cover 40 and the packing ring 50 press and position the filter segments 21 and the engaging element 30 against the carrier surface 11 of the carrier 10. Therefore, when the quality of the whole assembly of the present invention is defective, for instance due to incorrectable rotational imbalance, the bolts 60 can be loosened so as to remove the color filter assembly 20 for replacement with a new assembly. Thus, the present invention not only permits replacement of defective components, but also allows continued use of the motor 100, thereby effectively minimizing the production costs.

Figure 6:
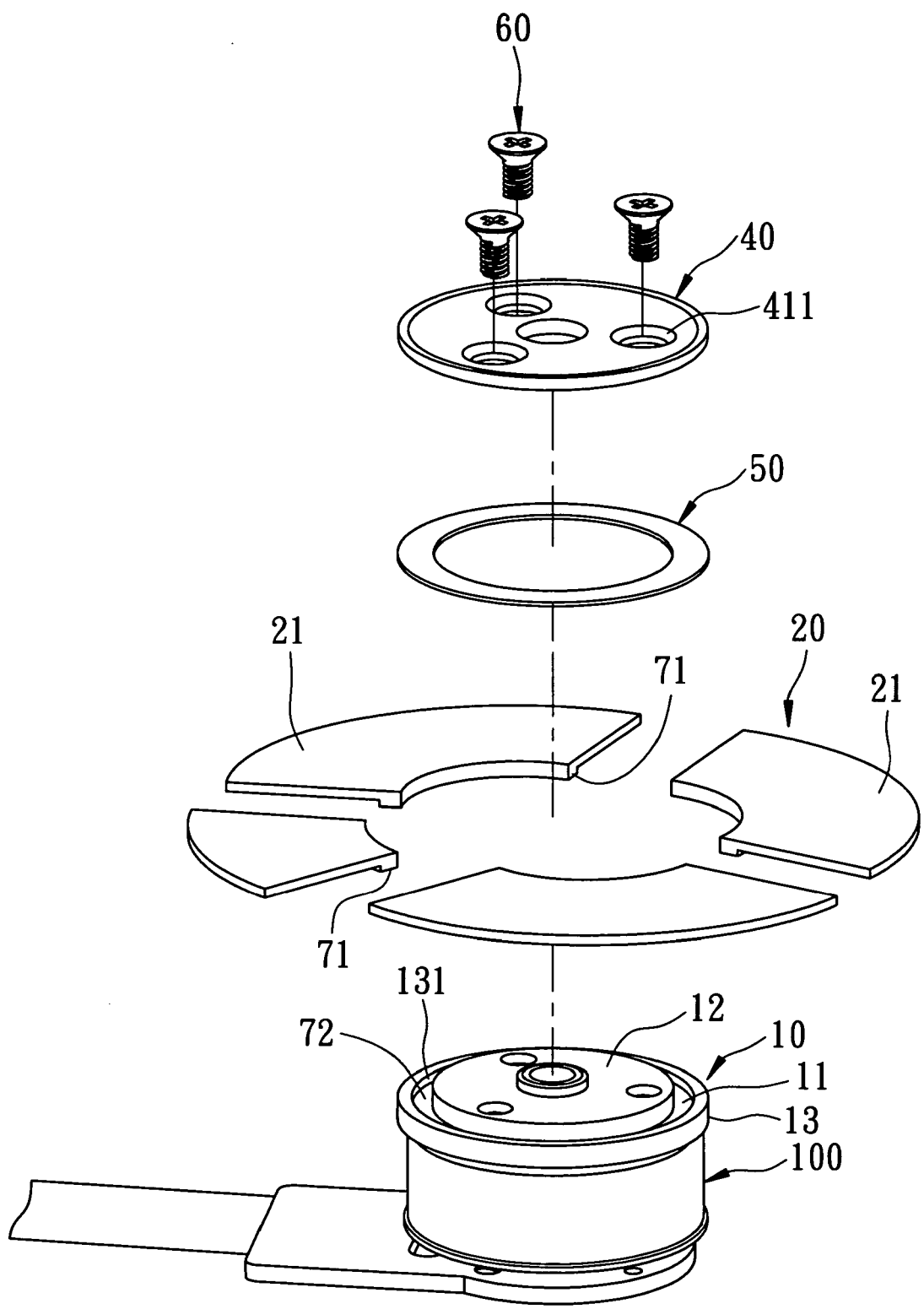
FIG. 6 is an exploded perspective view of the second preferred embodiment of a color wheel according to the present invention.
Figure 7:
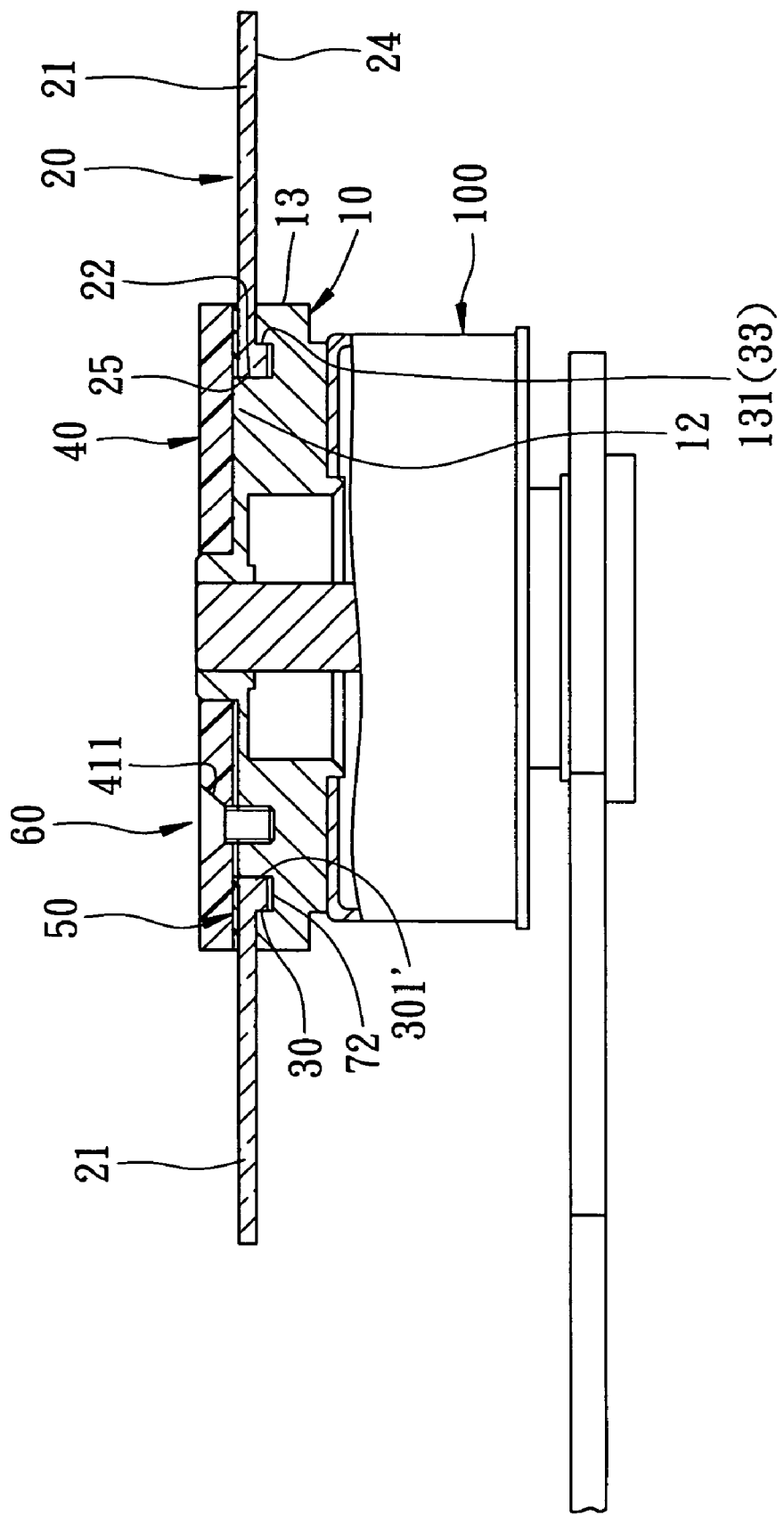
FIG. 7 is a partly sectional view of the second preferred embodiment in an assembled state.

Referring to FIGS. 6 and 7, the second preferred embodiment of a color wheel according to the present invention is shown to be substantially similar to the first preferred embodiment. However, in this embodiment, the limiting element is provided on the carrier 10, and is formed as an annular protrusion 13, which projects axially and upwardly from an outer periphery of the carrier surface 11 and which has an inner peripheral face 131 extending circumferentially around the central boss 12. The protrusion 13 and the central boss 12 define an annular groove 72 therebetween. The engaging element 30 is formed by interconnecting a plurality of protruding pieces 71 that project axially and integrally from bottom surfaces of the respective filter segments 21 so as to form an annular flange 301'. The flange 301' has an outer peripheral face 33 extending around the through hole 31. The protruding pieces 71 can be preformed before adhering to the respective filter segments 21.

When the filter segments 21 are mounted on the carrier surface 11 of the carrier 10, the flange 301' extends into the groove 72, and the bolts 60 are passed respectively through the through holes 411 in the press cover 40, and engage threadedly the central boss 12 of the carrier 10 so that the press cover 40 is connected securely to the carrier 10. As such, the press cover 40 presses tightly the filter segments 21 against the carrier surface 11 through the packing ring 50, and the flange 301' can be positioned fixedly in the groove 72. At this time, the outer peripheral face 33 of the flange 301' extends around and abuts against the inner peripheral face 131 of the protrusion 13. When the motor 100 drives the filter segments 21 to rotate at a high speed, even in the presence of a centrifugal force, the filter segments 21 can be prevented from displacing radially because of the engagement between the flange 301' and the groove 72. Thus, the advantages of the first preferred embodiment can be similarly attained using the second preferred embodiment of this invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A color wheel comprising:
    a carrier;
    a color filter assembly mounted coaxially on said carrier and formed by a plurality of annularly arranged filter segments, said color filter assembly defining an inner periphery extending around an axis of said carrier, an outer periphery extending around said inner periphery, an upper surface and a lower surface extending between said inner and outer peripheries, and an engaging element projecting axially from one of said upper and lower surfaces;
    a press cover connected to said carrier to press said filter segments against said carrier; and
    a limiting element projecting axially toward said engaging element from one of said carrier and said press cover to engage said engaging element so as to prevent said color filter assembly from displacing radially from said axis of said carrier due to a centrifugal force, wherein said carrier has a central boss, said engaging element being formed as an annular flange, which projects from said upper surface proximate to said inner periphery and which has an outer peripheral face extending circumferentially around said central boss.

2. The color wheel as claimed in claim 1, further comprising a packing ring clamped between said press cover and said color filter assembly.

3. The color wheel as claimed in claim 1, wherein said press cover is formed as a circular plate, said limiting element being provided on said press cover and being formed as an annular protrusion which projects axially and downwardly from said circular plate and which has an inner peripheral face extending around and abutting against said outer peripheral face of said annular flange.

4. A color wheel comprising:
- a carrier having a central boss;
- a color filter assembly mounted coaxially on said carrier and formed by a plurality of annularly arranged filter segments, said color filter assembly defining an inner periphery extending around an axis of said carrier, an outer periphery extending around said inner periphery, an upper surface and a lower surface extending between said inner and outer peripheries, and a substantially annular engaging element projecting axially from said lower surface around said central boss, each of said filter segments having a protruding piece, said protruding pieces of said filter segments cooperatively forming said annular engaging element;
- a press cover connected to said carrier and pressing said filter segments proximate to said protruding pieces and against said carrier; and
- a limiting element projecting axially toward said engaging element from said carrier to engage said engaging element so as to prevent said color filter assembly from displacing radially from said axis of said carrier due to a centrifugal force, said limiting element having an inner peripheral face extending around and abutting against an outer peripheral face of said annular engaging element.

5. The color wheel as claimed in claim 4, further comprising a plurality of fasteners for fastening said press cover to said central boss, said fasteners being spaced apart annularly around said axis of said carrier.

6. The color wheel of claim 4, wherein each of said filter segments is formed as one-piece with said protruding piece.

* * * * *